US011674768B2

(12) United States Patent
Mogaka

(10) Patent No.: US 11,674,768 B2
(45) Date of Patent: Jun. 13, 2023

(54) SMART HOME SYSTEM WITH FIREARM TRACKING

(71) Applicant: Patrice Mogaka, Pheonix, AZ (US)

(72) Inventor: Patrice Mogaka, Pheonix, AZ (US)

(73) Assignee: Patrice Nyakundi Mogaka, Plano, TX (US)

( * ) Notice: Subject to any disclaimer, the term of this patent is extended or adjusted under 35 U.S.C. 154(b) by 0 days.

(21) Appl. No.: 17/500,258

(22) Filed: Oct. 13, 2021

(65) Prior Publication Data

US 2022/0113102 A1    Apr. 14, 2022

Related U.S. Application Data

(60) Provisional application No. 63/090,838, filed on Oct. 13, 2020.

(51) Int. Cl.
| | | |
|---|---|---|
| *F41A 17/06* | (2006.01) |
| *G06F 21/34* | (2013.01) |
| *H04L 67/306* | (2022.01) |
| *G06F 21/32* | (2013.01) |
| *G08B 13/14* | (2006.01) |
| *G08B 3/10* | (2006.01) |
| *H04L 67/12* | (2022.01) |

(52) U.S. Cl.
CPC ............ *F41A 17/063* (2013.01); *G06F 21/32* (2013.01); *G06F 21/34* (2013.01); *G08B 3/10* (2013.01); *G08B 13/1427* (2013.01); *H04L 67/12* (2013.01); *H04L 67/306* (2013.01)

(58) Field of Classification Search
CPC ........ F41A 17/063; G06F 21/32; G06F 21/34; G08B 3/10; G08B 13/1427; H04L 67/12; H04L 67/306
See application file for complete search history.

(56) References Cited

U.S. PATENT DOCUMENTS

| | | | |
|---|---|---|---|
| 8,947,252 B2 | 2/2015 | Wilson | |
| 9,752,840 B1 * | 9/2017 | Betro | H04W 4/029 |
| 10,557,676 B2 * | 2/2020 | Masarik | F41A 9/62 |
| 10,837,723 B2 * | 11/2020 | Black | G08B 15/004 |
| 10,845,142 B2 * | 11/2020 | Flood | F41A 9/62 |
| 11,443,606 B2 * | 9/2022 | Baker | H01Q 1/2208 |

(Continued)

*Primary Examiner* — John A Tweel, Jr.
(74) *Attorney, Agent, or Firm* — Daniel Boudwin; Tyler Donato; Patrice Nyakundi Mogaka

(57) ABSTRACT

A smart home system with firearm tracking includes a sensor network installed within a building and a control panel including an input mechanism, a display screen, a wireless transceiver, and a scanning mechanism. The system is configured to monitor at least one firearm that has an ammunition sensor, a GPS sensor, a wireless transceiver, and a magazine having a unique scannable QR code. The control panel receives user identification information via the input mechanism or an external remote device, generates a user profile that includes the identification information, scans the unique QR code of the firearm magazine, assigns the magazine to a selected user profile, and receives an ammunition count from the firearm as detected by the ammunition sensor. The system can send location and ammunition change notifications to the control panel display, external user devices, and emergency authorities to enhance the safety of the firearm user and general public.

10 Claims, 3 Drawing Sheets

(56) References Cited

U.S. PATENT DOCUMENTS

| | | |
|---|---|---|
| 2010/0315235 A1 | 12/2010 | Adegoke et al. |
| 2014/0259841 A1* | 9/2014 | Carlson .................. F41A 17/08 42/70.11 |
| 2014/0290110 A1 | 10/2014 | Stewart et al. |
| 2016/0173832 A1 | 6/2016 | Stewart et al. |
| 2017/0010062 A1* | 1/2017 | Black .................. F41A 17/063 |
| 2017/0074617 A1 | 3/2017 | Stewart et al. |

* cited by examiner

SMART HOME SYSTEM WITH FIREARM TRACKING

CROSS REFERENCE TO RELATED APPLICATIONS

This application claims the benefit of U.S. Provisional Application No. 63/090,838, filed on Oct. 13, 2020. The above identified patent application is herein incorporated by reference in its entirety to provide continuity of disclosure.

BACKGROUND OF THE INVENTION

The present invention relates to a smart home system with monitoring capabilities. More specifically, the present invention provides a smart home system with various sensors and tracking capabilities for monitoring the use and location of firearms.

It is important for firearm owners to use safe practices whenever a firearm is being transported, stored, or used. Failure to practice proper firearm safety can lead to risk of injury or death to the firearm owner and other individuals. Due to the inherently dangerous and risky nature of firearms, it would be beneficial to provide a system that can track individual firearms as they are assigned to individual owners. When firearms are utilized, it can be difficult for law enforcement agencies to determine who the firearm belongs to, how many ammunition rounds were fired, and other important information. Such information can be crucial to solve crimes and would increase overall safety. In other words, it would benefit the public and the individual firearm owner to have a system that informs of the current location of the firearm and the status of the ammunition. Such a system can utilize identification mechanisms that associate a firearm with its individual owner. It is desirable for the owner to be notified remotely or via a central control panel within the home of the owner. In this way, overall firearm safety can be substantially improved with such a system.

Devices have been disclosed in the known art that relate to wirelessly controllable and programmable firearm tracking systems. These include devices that have been patented and disclosed in patent application publications. However, the devices in the known art have several drawbacks. For example, these systems are typically only able to track location of a firearm and are unable to monitor the ammunition utilized by the firearm. Further, these systems typically lack a centralized control panel located within a home, which allows individuals within the home to register firearms and other items to the system in order to track those items. Further, the systems in the prior art typically lack a mechanism for notifying law enforcement when a change in ammunition occurs, or when the firearm leaves the premises to which it is registered.

In light of the systems disclosed in the known art, it is submitted that the present invention substantially diverges in design elements from the prior art and consequently it is clear that there is a need in the art for an improvement to existing firearm tracking and notification systems. In this regard the instant invention substantially fulfills these needs.

SUMMARY OF THE INVENTION

The present invention provides a smart home system with firearm tracking wherein the same can be utilized for monitoring the location and ammunition count of a firearm, while also associating that firearm with an individual user for identification purposes. The smart home system with firearm tracking generally a sensor network comprising a plurality of sensors installed within a building. A control panel is installed within the building and operably connected to the sensor network, the control panel comprising an input mechanism, a display screen, a wireless transceiver, and a scanning mechanism. The system is configured to monitor at least one firearm comprising an ammunition sensor, a GPS sensor, a wireless transceiver, and a magazine having a unique scannable QR code.

The control panel further includes a processer, a non-transitory computer readable medium operatively connected to the processor, and a logic stored in the non-transitory computer readable medium that, when executed by the processor, causes the system to perform a method, which includes receiving user identification information via the control panel or via an external remote device; generating a unique user profile that includes the user identification information; scanning a unique QR code of the magazine of a firearm via the scanning mechanism; assigning the scanned magazine to a selected user profile; and receiving an ammunition count from the firearm as detected by the ammunition sensor. If the ammunition sensor detects a discharge of the firearm, then receiving from the firearm a notification that includes a geographic location of the firearm and a current ammunition count as detected by the ammunition sensor. The notification can be transmitted to the control panel, to the individual user, and to an emergency authority, and can also include geographic location information of the firearm as determined by the firearm's GPS sensor. In this way, the individual and emergency authorities are made aware of the current status of the firearm to increase the safety of the general public and the firearm's owner.

One object of the present invention is to provide a smart home system with firearm tracking that can register and track other items such as vehicles and the like.

Another object of the present invention is to provide a smart home system with firearm tracking having voice control options at the control panel.

A further object of the present invention is to provide a smart home system with firearm tracking that includes artificial intelligence software for improving the system's automation.

Another object of the present invention is to provide a smart home system with firearm tracking that includes biometric access controls and user identity verification in the form of fingerprint scanning, facial recognition, or the like.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
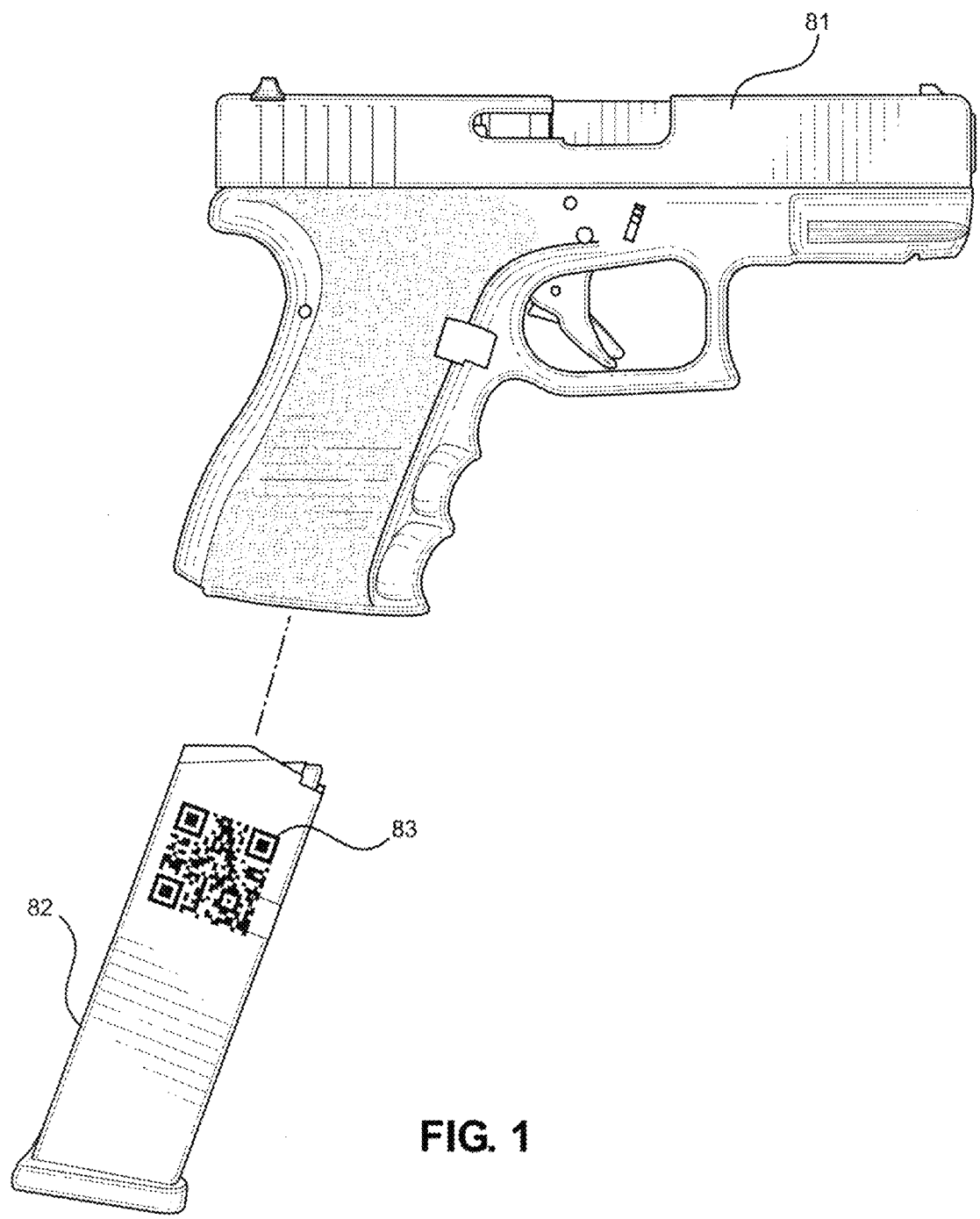
FIG. 1 shows a side elevation view of an example firearm and magazine with a unique QR code in an embodiment of the smart home system with firearm tracking.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

Reference is made herein to the attached drawings. Like reference numerals are used throughout the drawings to depict like or similar elements of a control system. For the purposes of presenting a brief and clear description of the present invention, a preferred embodiment will be discussed as used for providing a wirelessly controllable and programmable firearm tracking system that notifies individuals and law enforcement of ammunition changes, firearm locations, and other events. The figures are intended for representative purposes only and should not be considered to be limiting in any respect.

Referring now to FIG. 1, there is shown a side elevation view of an example firearm and magazine with a unique QR code in an embodiment of the smart home system with firearm tracking. The firearm 81 is shown as a handgun but may be any type of firearm or projectile weapon that utilizes ammunition. The firearm 81 includes a magazine 82 having a unique QR code 83. In the shown embodiment, the unique QR code 83 is positioned on an elongated exterior side of the firearm magazine. This allows the QR code 83 to be easily accessible and readily visible for scanning purposes. The system can scan individual magazines and assign them to individual users of the system for tracking purposes.

Figure 2:
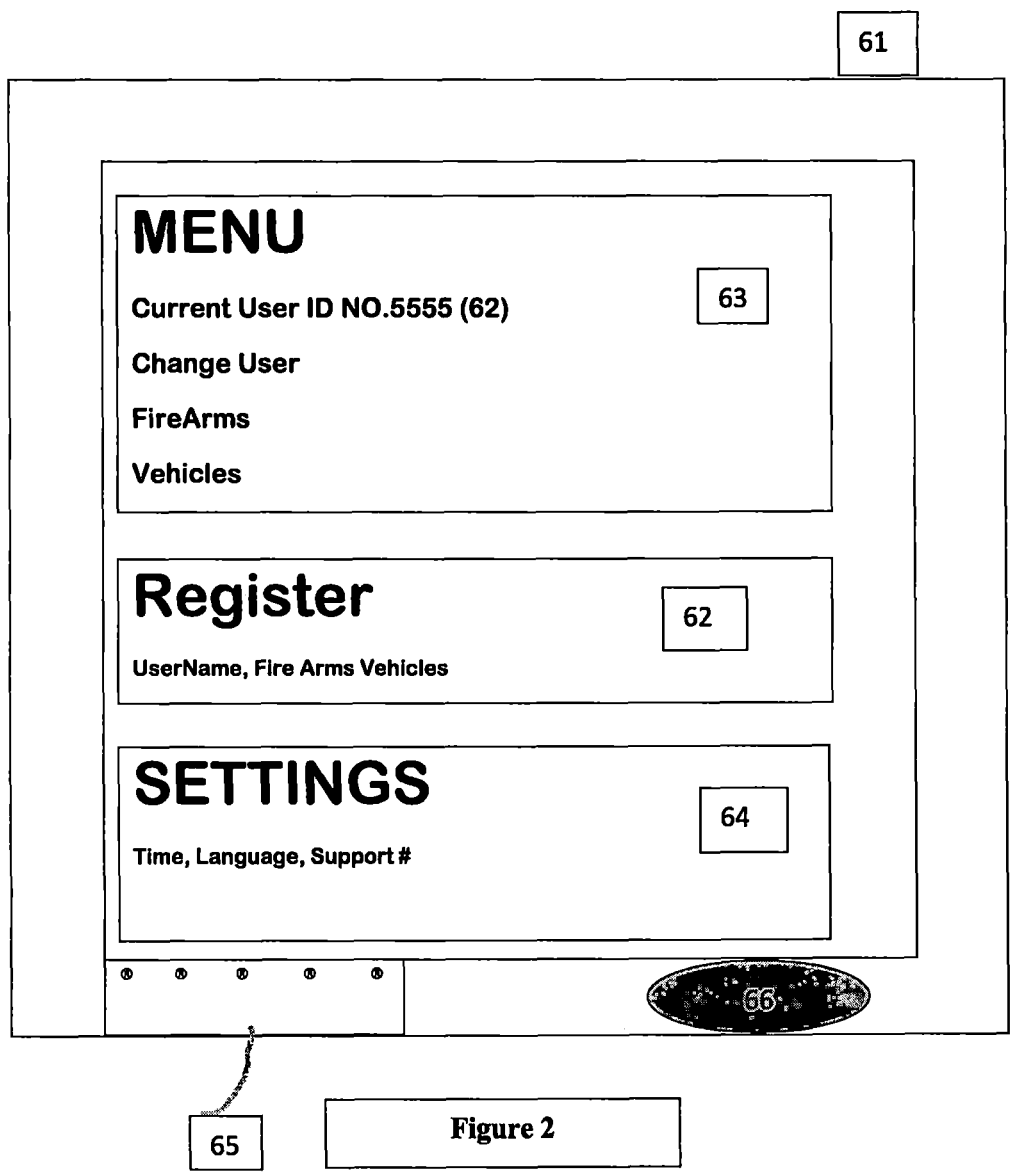
FIG. 2 shows a perspective view of an example control panel from an embodiment of the smart home system with firearm tracking.

Referring now to FIG. 2, there is shown a perspective view of an example control panel from an embodiment of the smart home system with firearm tracking. The control panel 61 is installed within the home of the individual firearm owner. The control panel 61 includes a display with input controls, such as a touchscreen as with the shown embodiment. The control panel 61 further includes a scanning mechanism 65 configured to read QR codes and may also include a microphone and speaker 66 for emitting audible alerts and receiving voice commands. In the exemplary embodiment, the control panel 61 displays a current user window 62 which identifies the current user of the system. The system can support multiple independent users. A status window 63 can be utilized to list the user's registered firearms, magazines, and other items such as vehicles, which could be stored via VIN numbers or other identifying information. An options menu 63 allows users to select their profile, allows new users to register, and allows registration of new vehicles, firearms, magazines, and other items.

In some embodiments, the user profile can be created with a stored biometric image, such as a fingerprint, facial recognition image, or the like. The system memory stores the image. In order to access the user profile, the system must first receive a biometric image via the scanning device 65 or via a remote communication from an external device, such as a smartphone. If the biometric image matches the stored image, then the system allows access to the user profile. Other display windows 64 can display notification information. For example, when a particular user profile is selected, the window 64 may display current ammunition counts, firearm location, and other information. Notifications can be displayed when such information is updated or otherwise changes.

Figure 3:
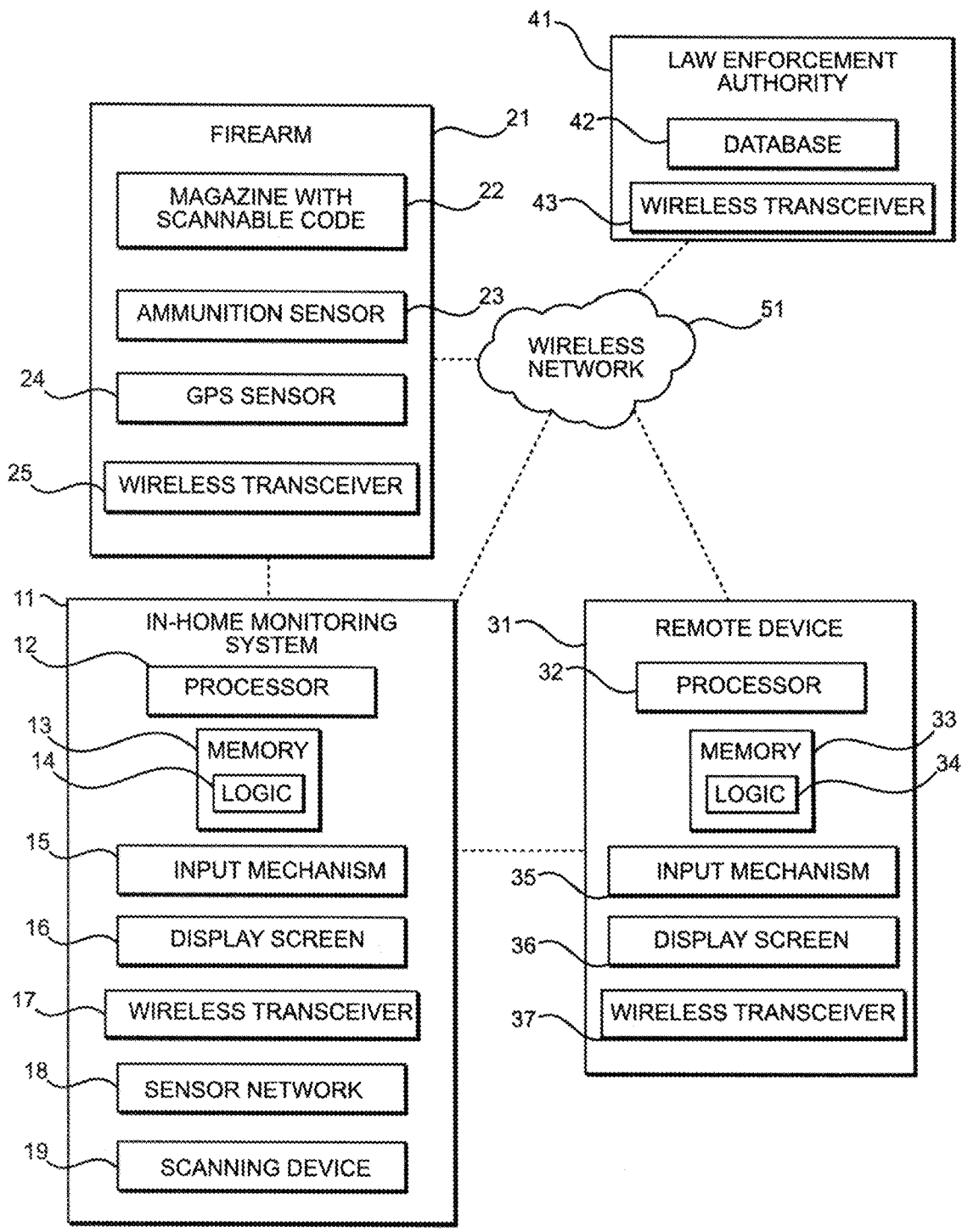
FIG. 3 shows a block diagram of the various components of an embodiment of the smart home system with firearm tracking.

Referring now to FIG. 3, there is shown a block diagram of the various components of an embodiment of the smart home system with firearm tracking. The in home monitoring system or control panel 11 generally includes a sensor network 18 comprising a plurality of sensors installed within a building. The sensor network 18 can include proximity sensors, motion sensors, cameras, RFID sensors, and other types of sensors. The sensors are operably connected to the control panel of the in-home monitoring system 11 and are configured to determine a distance between a firearm 21 and the building in which the system is installed. If the sensor network 18 detects the firearm 21 leaving a threshold distance from the building, then the control panel 11 transmits a notification to an external device or an emergency authority. In some embodiments, the threshold distance can be adjusted to different distances. This will allow individuals to use their firearm on their own property or yard without notifications being generated, if desired.

The system tracks firearms that include at least an ammunition sensor 23, a GPS sensor 24, and a wireless transceiver for communication of ammunition information and location information. In one embodiment, the ammunition sensor 23 can include an optical sensor or other types of sensors and is configured to detect the current amount of rounds in the magazine within the firearm, and can also detect a change in the count. The GPS sensor 24 can be in wireless communication with global positioning satellites to determine the current geographic information of the firearm. Such information is transmitted to the control panel via the wireless transceiver 25 of the firearm. Exchange of information via the firearm 21, the control panel 11, the remote device 31, and law enforcement authorities is accomplished via wireless communication over a shared network 51, such as the internet, a bluetooth connection, or any other suitable wireless communication protocols.

The control panel 11 includes an input mechanism 15, a display screen 16, a wireless transceiver 17, and a scanning mechanism 19 for reading the QR codes. The control panel 11 further includes a processer 12, a non-transitory computer readable medium or memory 13 operatively connected to the processor 12, and a logic 14 stored in the memory 13 that, when executed by the processor 12, causes the system to perform a method. First, the system receives user identification information via the control panel or via an external remote device, such as a smartphone, for example. The logic 14 generates a unique user profile that includes the user identification information, which may include biometric identification images for verification. The scanning device 19 is utilized to scan a unique QR code of the magazine of a firearm. The system assigning the scanned magazine to a selected user profile. The system can also register firearms, vehicles, and other objects.

The wireless transceiver 25 of the firearm allows the system to receive an ammunition count from the firearm as detected by the ammunition sensor 23. If the ammunition sensor 23 detects a discharge of the firearm, then the system receives from the firearm a notification that includes a geographic location of the firearm and a current ammunition count as detected by the ammunition sensor 23. The system also transmits such notification to an external device of the user so the user can have updated information even if they are not in the home, and also transmits to the emergency authorities. Such information can be stored on their database 42 for use at any time when investigating firearm discharges, thefts, or other incidents involving the firearm 21. The notification can be displayed on the control panel display screen or emitted through the speaker. Further, the speaker and microphone can be utilized to receive voice commands, and artificial intelligence software can be utilized to improve the overall functionality of the system.

In some embodiments of the present invention, the information regarding firearm ownership identity can be stored within the law enforcement database 42 and associated with other stored information. For example, the database 42 may match the stored firearm ownership information with records regarding license plates for vehicles the individual has registered. If a law enforcement officer were to pull over a vehicle and check the registration of the license plate number, the database 42 will indicate if the individual who registered the license plate also has a registered firearm.

In some embodiments, the GPS sensor 24 of the firearm 21 is operably connected to an internal controlling processor that can selectively disable the firing mechanism of the firearm 21. For example, the firearm 21 can include an onboard processor with a memory and logic that is configured to monitor the current location of the firearm via the GPS sensors 24. In other embodiments, the magazine can include internal programmable mechanisms that operate an interlock which can selectively prevent ammunition from advancing when the trigger is pulled. Information regarding particular "safe zones" where the firearm cannot be fired can be stored in the memory and received via the control panel 11 of the system, an external device 31, or law enforcement authorities 41. The firearm's internal processor is configured to prevent the firing mechanism from activating if the trigger is pulled while the GPS sensor detects that the firearm is within the area designated as the "safe zone". As one example, the firearm's internal logic can be programmed to prevent it from operating in school zones, public spaces, inside dwellings, or in any other desired location.

In other embodiments, the control panel 11 of the system is configured to alert the remote device 31 of the presence of a firearm 21 within a predefined area. When the in-home monitoring system 11 detects the GPS sensor 24 of the firearm 21 within a predefined geographic location, such as a home or a business, an alert may be sent to the remote device 13 via the wireless transceiver 17 of the system 11. As such, the individual will be alerted via the remote device 31, such as a mobile phone, to the presence of the firearm 21.

Overall, the system provides an improved mechanism for tracking firearms, monitoring ammunition usage, and the like. The system thus notifies firearm owners if anything is amiss with their firearm. Further, the system notifies emergency authorities of ammunition changes and other events, in order to increase the overall safety of the firearm user and the general public.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A smart home system with firearm tracking, comprising:
a sensor network comprising a plurality of sensors installed within a building; a control panel installed within the building and operably connected to the sensor network, the control panel comprising an input mechanism, a display screen, a wireless transceiver, and a scanning mechanism;
at least one firearm comprising an ammunition sensor, a GPS sensor, a wireless transceiver, and a magazine having a unique scannable QR code;
the control panel further comprising a processor, a non-transitory computer readable medium operatively connected to the processor, and a logic stored in the non-transitory computer readable medium that, when executed by the processor, causes the system to perform a method, the method comprising:
receiving user identification information via the control panel or via an external remote device;
generating a unique user profile that includes the user identification information;
scanning a unique QR code of the magazine of a firearm via the scanning mechanism;
assigning the scanned magazine to a selected user profile;

receiving an ammunition count from the firearm as detected by the ammunition sensor;

if the ammunition sensor detects a discharge of the firearm, then receiving from the firearm a notification that includes a geographic location of the firearm and a current ammunition count as detected by the ammunition sensor.

2. The smart home system with firearm tracking of claim 1, wherein the method further comprises:

displaying the current ammunition count of the magazine of the at least one firearm on the display screen of the control panel.

3. The smart home system with firearm tracking of claim 1, wherein the method further comprises:

transmitting the geographic location of the at least one firearm to a law enforcement authority.

4. The smart home system with firearm tracking of claim 1, wherein the control panel further comprises a speaker configured to emit audible alerts.

5. The smart home system with firearm tracking of claim 1, wherein the control panel further comprises a microphone configured to receive voice commands.

6. The smart home system with firearm tracking of claim 1, wherein the method further comprises:

if the sensor network detects the firearm leaves a threshold distance from the building, then the control panel transmitting a notification to an external device.

7. The smart home system with firearm tracking of claim 4, wherein the method further comprises:

emitting an audible alert via the speaker if the firearm location is detected to be greater than a threshold distance from the sensor network or if a change in the ammunition count of the firearm magazine is detected.

8. The smart home system with firearm tracking of claim 1, wherein the unique QR code of the firearm magazine is disposed on a elongated side portion of the firearm magazine.

9. The smart home system with firearm tracking of claim 1, wherein the plurality of sensors includes proximity sensors configured to monitor the distance between the control panel and the firearm magazine.

10. The smart home system of claim 1, the method further comprising:

receiving biometric identification information from the external device;

if the biometric identification information from the external device matches a biometric image stored in the memory with an individual user profile, then allowing access to the individual user profile.

* * * * *